United States Patent [19]

Syrbe et al.

[11] 4,257,100
[45] Mar. 17, 1981

[54] ELECTRONIC DATA PROCESSING SYSTEM FOR REAL TIME DATA PROCESSING

[75] Inventors: Max Syrbe; Dirk Heger, both of Karlsruhe-Waldstadt, Fed. Rep. of Germany

[73] Assignee: Fraunhofer-Gesellschaft zur Forderung der angewandten Forschung e.V., Munich, Fed. Rep. of Germany

[21] Appl. No.: 947,224

[22] Filed: Sep. 29, 1978

Related U.S. Application Data

[63] Continuation-in-part of Ser. No. 603,213, Aug. 8, 1975, abandoned.

[30] Foreign Application Priority Data

Aug. 10, 1974 [DE] Fed. Rep. of Germany ....... 2438536

[51] Int. Cl.³ .................... G06F 15/16; G06F 11/20
[52] U.S. Cl. ............................... 364/200; 371/9; 371/11
[58] Field of Search ............... 179/15 AL; 235/303, 235/303.4, 303.41; 364/200 MS File, 900 MS File; 371/7, 8, 9, 11, 15, 16

[56] References Cited

U.S. PATENT DOCUMENTS

| | | | |
|---|---|---|---|
| 3,623,011 | 11/1971 | Baynard et al. | 364/200 |
| 3,755,789 | 8/1973 | Collins | 364/200 |
| 3,814,859 | 6/1974 | Vrba et al. | 179/15 AL |
| 3,859,468 | 1/1975 | Smith et al. | 179/15 AL |
| 3,879,710 | 4/1975 | Maxemchuk et al. | 179/15 AL X |
| 3,879,712 | 4/1975 | Edge et al. | 364/200 |
| 3,905,023 | 9/1975 | Perpiglia | 364/200 |
| 4,015,246 | 3/1977 | Hopkins | 364/200 |
| 4,019,176 | 4/1977 | Cour et al. | 364/200 |
| 4,123,794 | 10/1978 | Matsumoto | 235/303.4 X |

*Primary Examiner*—Mark E. Nusbaum
*Attorney, Agent, or Firm*—John C. Smith, Jr.

[57] ABSTRACT

An electronic data processing system for real time data processing comprises a plurality of spatially distributed microcomputer stations which work simultaneously in real time especially for process control. The microcomputer stations contain gates between their components such as the microcomputer, input/output devices and so on. They are additionally interconnected by a bus line system through at least two independent data paths. Furthermore sensors and actuators are redundantly connected to two or more microcomputer stations. According to the invention in case of a breakdown of any component the real time data processing and data communication tasks will be performed by means of a second independent path between sensors and associated actuators.

9 Claims, 15 Drawing Figures

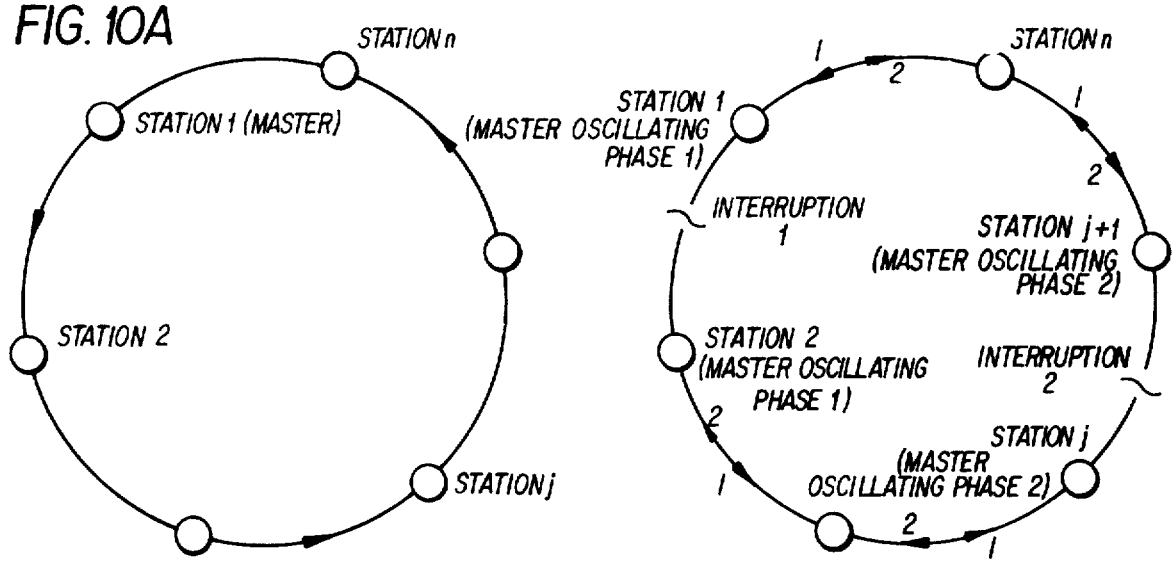
FIG. 10A
FIG. 10B
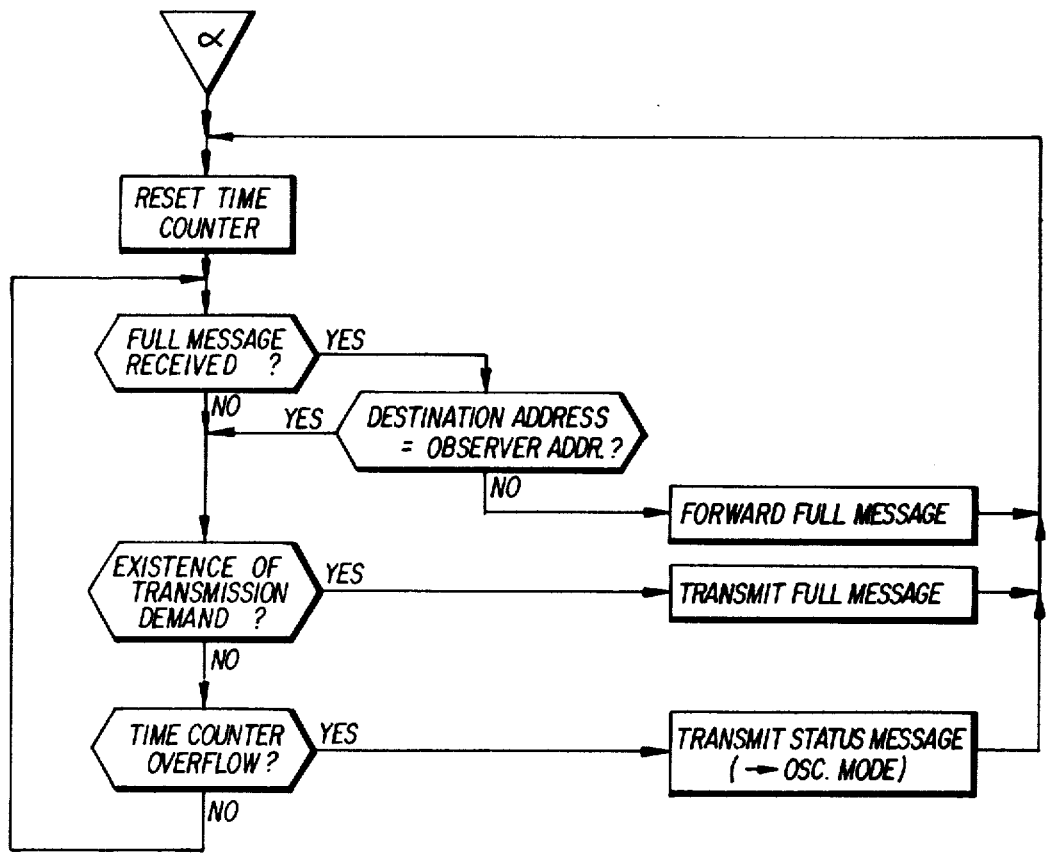
FIG. 13

ELECTRONIC DATA PROCESSING SYSTEM FOR REAL TIME DATA PROCESSING

BACKGROUND OF THE INVENTION

This application is a continuation-in-part of Ser. No. 603,213 filed Aug. 8, 1075, now abandoned, which is incorporated by reference in its entirety.

The invention relates to an electronic date processing system (EDP-system) specially designed for real time data processing and for limiting the effect of apparatus and programming faults, i.e. for improving reliability, and particularly for the control and regulation of technical processes.

In the subsequent discussion reference is made to the following publications:

(1) Plessmann, K. W.: Prozesssignalelemente. Interfacing of sensors and final control-elements to control computers. Elektro-Anzeiger 1974, No. 5 and No. 9

(2) Syrbe, M.: Messen, Steuern, Regeln mit Prozessrechnern. Measuring and Controlling by Means of Control Computers. Akademische Verlagsgesellschaft, Frankfurt (1972), sect. 4.4.

(3) Klaus, J.: Programmierbare Vielstellen-Messanlage nach dem Party-Line-System. Programmable Arrangement for Data Acquisition of Many Measuring Points According to the Party-Line-System. Elektronik 1972, No. 10.

(4) Halling, H.: Serielles CAMAC-Loop-System mit intelligenten Crate Controllern. Serial CAMAC-Loop-System Comprising Intelligent Crate Controllers. PDV-Entwicklungsnotiz, PDV-E9, P3.1/3, Jül-KfA (1973).

(5) Färber, G.: Duplexringleitungssystem mit normierten Schnittstellen. Duplex Ringbus System with Standardized Interfaces. PDV-Entwicklungsnotiz (PDV-E18, P3.2/2, M-PCS/1 (1973).

(6) Syrbe, M.: Messen, Steuern, Regeln mit Prozessrechnern. Measuring and Controlling by Means of Control Computers. Akademische Verlagsgesellschaft, Frankfurt (1972), sect. 2 and 3

(7) Färber, G.: Dezentralisierte Datenverarbeitungskonzepte mit Hilfe von Mikroprozessoren. Concepts of Decentralizing Data Processing by the Use of Microprocessors. On-line 1973, pp 784–789.

In such real time EDP-systems a hardware structure and a distribution of working capacities is needed which, on the one hand, despite a wide physical distribution of the measuring sensors and process actuators, combines low wiring costs with high reliability, and which, on the other hand, possesses approximately the same operating convenience as a high performance central computer. Account must also be taken of the falling tendency of semiconductor equipment costs and of the continued rise in planning, wiring and programming costs.

Real time data processing systems are known which comprise a centrally localized computer which is occasionally duplicated for increasing its reliability[1],[2]. All the process sensors and actuators are usually connected star-like via a central cable distributor, an arrangement which involves considerable expenditure for cabling. Sometimes, mostly in the context of laboratory automation, these several components are interconnected by a common "bus" [3],[4],[5] which means "data transmission line", an arrangement which does reduce wiring cost, although by reducing reliability and real time processing capability, certainly not improving the same. Also known are so-called hierarchic computer systems, but these incorporate dispositional functions in the system without optimization and include no arrangements relative to the effects above mentioned [6]. In the field of commercial, i.e. non-real-time data processing, data processing systems comprising distribution computer terminals for data input have been proposed[7].

SUMMARY OF THE INVENTION

The object of the invention is an electronic data processing system with a hardware structure and operating system which is optimal with respect to wiring costs, reliability and performance.

According to the invention, this object is achieved by use of a plurality of distributed, that is spatially separated, simultaneously running real time microcomputer stations which are interconnected by a self-contained high-speed bus in such a way that each component (e.g. each microcomputer station or process input/output device) is accessible by at least two independent paths. The basic structure of the microcomputer stations is so designed by the provision of suitable gates (switches) that operations at reduced capacity can continue when the bus interchange unit or the microcomputer or the process input/output device fails. The minicomputer stations may be used with a main computer.

BRIEF DESCRIPTION OF THE DRAWINGS

Some embodiments of the invention will now be described by way of an example with reference to the accompanying drawings, in which:

FIG. 10 is a schematic representation of one method of transmission control;

FIGS. 11, 12 and 13 are schematic representations of two modes of centralized communication control;

DESCRIPTION OF THE PREFERRED EMBODIMENTS

The geometric layout of the wiring system is to be optimized by way of calculation. The ring structure of the bus is chosen because this is the simplest way of interconnecting the microcomputer stations through at least two independent paths.

In order to achieve the desired properties, the spatial distribution of the microcomputer stations in the area of the process sensors and actuators is to be so arranged that the sum of all the cable lengths is a minimum and very much shorter than in the case of a central computer with star-type cabling, depending upon the number of microcomputer stations. Sensors are devices measuring analog or digital signals or, more generally, primary elements of the technical process to be controlled. Actuators, e.g., manipulating devices or manipulators, serve components positioning elements or, are provided as, final controlling elements of the technical process to be controlled. The necessary decisions are subject to qualifying conditions, such as the association of locally distributed microcomputer stations allocated to subsidiary processes, for instance, in locations unsuitable for microcomputer stations or for cables taken through cable duct runs. For large scale processes, the assumption is justified that these qualifying conditions will not significantly affect the optimum number and the optimal locations of the microcomputer stations so that optimal conditions, worked out without taking account of such qualifications, may still serve as useful starting points for further planning.

Figure 1:
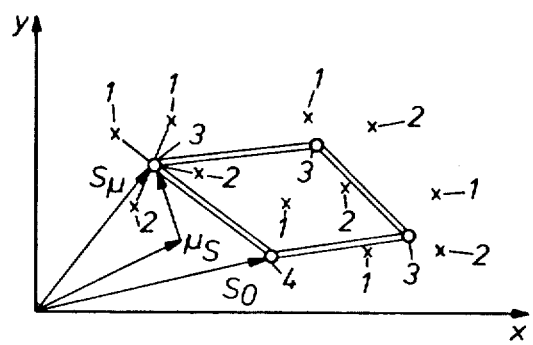
FIG. 1 is a diagram showing the locations of the process sensors and manipulating devices, the microcomputer stations and the main computer by vectors in a coordinate plane.

In FIG. 1 the locations of the process sensors 1 and actuators 2, the microcomputer stations 3 and the main computer 4 are represented by their vectors s in an x, y coordinate plane. The total line length S when there are m microcomputer stations and $n_\mu$ sensors and manipulators connected to the $\mu$th microcomputer station can then be calculated from $$S(m,s_\mu)\bigg|_{s_\nu} = \sum_{\mu=1}^{m} \sum_{\nu=1}^{n_\mu} \bigg|\mu s_\nu - s_\mu\bigg| + \sum_{\mu=1}^{m} \bigg|s_\mu - s_{\mu-1}\bigg| + \bigg|s_o - s_m\bigg| \stackrel{!}{=} \min \quad (1)$$

where $$\sum_{\mu=1}^{m} n_\mu = n$$

is the total number of sensors and manipulators $\mu_{s\nu}$ is the positional vector of the $\nu$th sensor and manipulator in the area of the $\mu$th microcomputer station.

$s_\mu$ is the positional vector of the $\mu$th microcomputer station.

$s_o$ is the positional vector of the main computer.
S depends upon m, $s_\mu$, and is always related to the given $s_\nu$. The first term contains the cable lengths connecting the sensors and actuators to the microcomputer stations, whereas the two other generally very much smaller terms contain the ring bus. Analytically, the minimum for this expression cannot be calculated. The problem is similar to the "round trip problem" in operations research. It should therefore be considered as a multistage decision process solved by dynamic programming. For this purpose, a quadratic suboptimization trial quantity S of distance without the second terms is selected and the result corrected by variance, as an intermediate step. For the sake of simplicity the solution will be given in unidimensional form, 1st Step:

$$\tilde{S}_1 = \sum_{\nu=1}^{n} (x_\nu - x_o)^2 \stackrel{!}{=} \min (\tilde{S}_1 \text{ approximation of } S_1) \quad (2)$$

$$\frac{d\tilde{S}_1}{dx_o} = -2 \sum_{\nu=1}^{n} (x_\nu - x_o) = 0 \quad (3)$$

$$x_o = \frac{1}{n} \sum_{\nu=1}^{n} x_\nu \text{ (corresponding to a center of gravity)} \quad (4)$$

Figure 2:
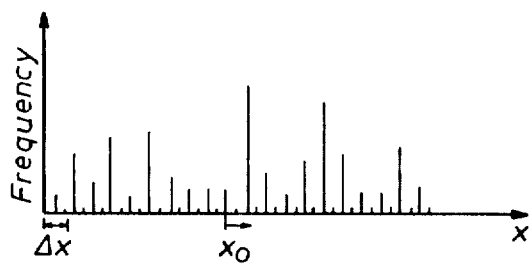
FIG. 2 is a diagram showing the intermediate step of the minimization of the length of the cables by way of calculation and indicates the frequency distribution of the sensors and actuators over the locating coordinate x.

The intermediate step is shown in FIG. 2 which indicates the frequency distribution of the sensors and manipulating devices over the locating coordinate x. The quadratic distance measure displaces $x_o$ in the direction towards remote $x_\nu$. This shift is compensated by a stepwise approach of the next center of density when checking the variation of $\tilde{S}_1 \to S_1$ (gradient method).

2nd Step: The number of sensors and actuators is divided at $x_o$, which means $$\tilde{S}_2 = \sum_{\mu=1}^{2} \sum_{\nu=1}^{n_\mu} (^\mu x_\nu - x_\mu)^2 \stackrel{!}{=} \min \quad (5)$$

$$\frac{d\tilde{S}_2}{dx_1} = -2 \sum_{\nu=1}^{n_1} (^1x_\nu - x_1) = 0, \; x_1 = \frac{1}{n_1} \sum_{\nu=1}^{n_1} {}^1x_\nu \quad (6)$$

$$\frac{d\tilde{S}_2}{dx_2} = -2 \sum_{\nu=1}^{n_2} (^2x_\nu - x_2) = 0, \; x_2 = \frac{1}{n_2} \sum_{\nu=1}^{n_2} {}^2x_\nu \quad (7)$$

The intermediate step is provided as above, followed by further steps, discontinued when a predetermined limit $|S_{i-1} - S_i|$ has been reached.

Figure 3:
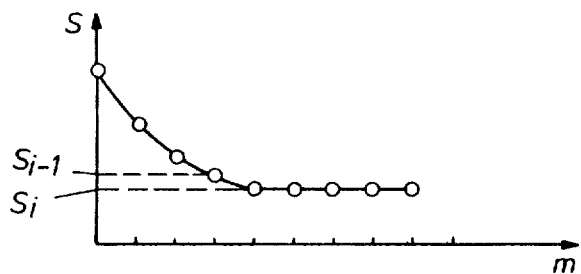
FIG. 3 is a diagram showing the result of the length minimization of the cables by way of calculation; it shows the optimal total cable length S as a function of the number of the microcomputer stations m.

The result regarding S is shown in FIG. 3 as the optimal total cable length S as a function of the number of microcomputer stations m. In a final step, the total cost K is numerically minimized with S(m), $$K = S \cdot K_s + m \cdot k_{MK} \stackrel{!}{=} \min \quad (8)$$

where $k_s$ ... cost of cable per unit of length
$k_{MK}$ ... cost per microcomputer station

DISTRIBUTION OF TASKS BETWEEN THE DISTRIBUTED PROCESSORS

When a programming system is highly segmented a favorable distribution of tasks between the different computers (microcomputers and main computer), can be achieved in a multiple computer system. Tasks in the field of problem solving which do not exceed the available storage capability of a microcomputer station can be handled by that station without causing flow of data through the bus to grow excessively. The complete technical process is subdivided into a plurality of technical subprocesses. This plurality of subprocesses and their dependencies are mapped onto the plurality of microcomputer stations and the communication between them. Thus the complete technical process can be controlled. The following Table gives a plausible distribution of tasks in a process computer system of decentralized structure according to FIG. 4:

TABLE 1

Figure 4:
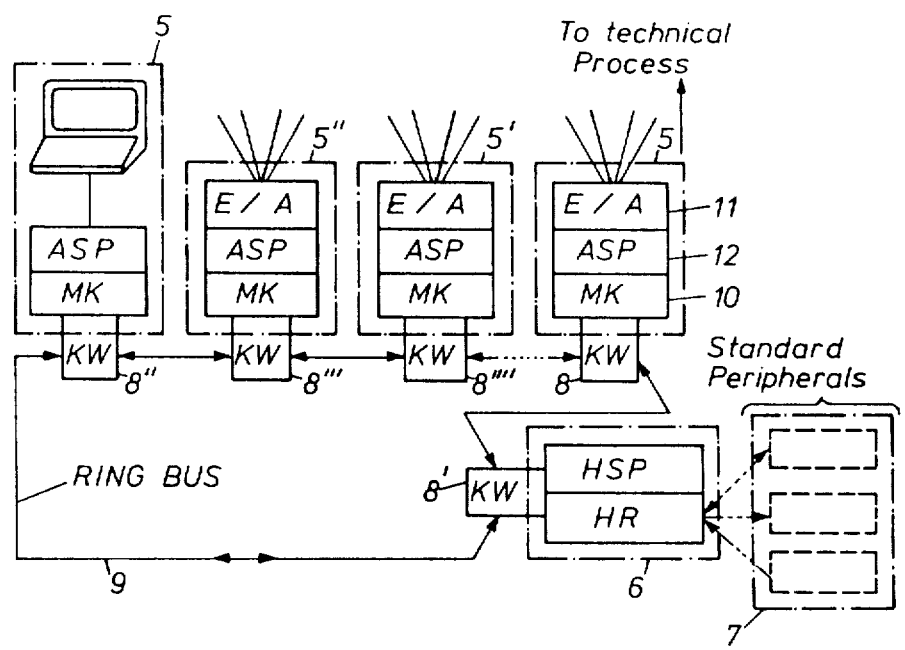
FIG. 4 shows a decentralized structure model with several microcomputers connected to a ring bus.

Distribution of tasks in a process computer system of decentralized structure according to FIG. 4.

| Tasks | Stations | in Computer |
|---|---|---|
| Data acquisition | Signal input<br>Smoothing<br>Plausibility control<br>Redundancy reduction | Storage of all data files<br>process model updating<br>Standardization of digital range, to console input-output |
| Control | Holding circuit (interpolation)<br>Monitoring (highest priority)<br>DDC<br>Signal output | Adaptive Control<br>Optimization<br>Monitoring (other priorities)<br>Material flow monitoring and balances |
| Back-up | Simple DDC algorithms | Tasks of faulty microprocessors |
| Man-machine communication<br>Operability<br>Maintenance | Self-test | Display of operative state at central control<br>Fault analysis<br>Test programs<br>Maintenance program<br>Program compiling |

According to Table 1 the main computer performs on-line programming (i.e. compiling, linking, down-line loading of the microcomputer stations), test and emergency tasks.

DECENTRALIZED STRUCTURE MODEL WITH DISTRIBUTED MICROCOMPUTERS

The invention will now be more particularly described with reference to FIGS. 4 to 12. FIG. 4 shows several microcomputer stations 5, a main computer 6 with standard peripherals 7. In FIG. 4 the main computer and the microcomputer stations are interconnected by interchange switching units (KW) 8 and a ring bus 9. The microcomputer stations are each equipped with a microprocessor (MK) 10, input/output devices (E/A) 11 and an internal working storage (ASP) 12. They perform direct digital control (DDC) algorithms, signal processing and back-up tasks as well as man machine communication tasks. Several operating states must be distinguished, some of which are: microcomputer inoperable, process I/O inoperable, interchange switching unit inoperable. Depending on these operating states, the microcomputer station is operating, for instance, isolated from the bus line or the process I/O is controlled externally by another computer (microcomputer or main computer) by means of the communication through the ring bus. If the bus has a ring structure, each computer in this multiple computer system can communicate with every other computer through two paths. The microcomputer stations each perform the tasks mentioned above. The ring bus reduces the failure probability of the bus system by nearly the square although the cost of the ring bus is usually only slightly above that of the branch.

Figure 5:
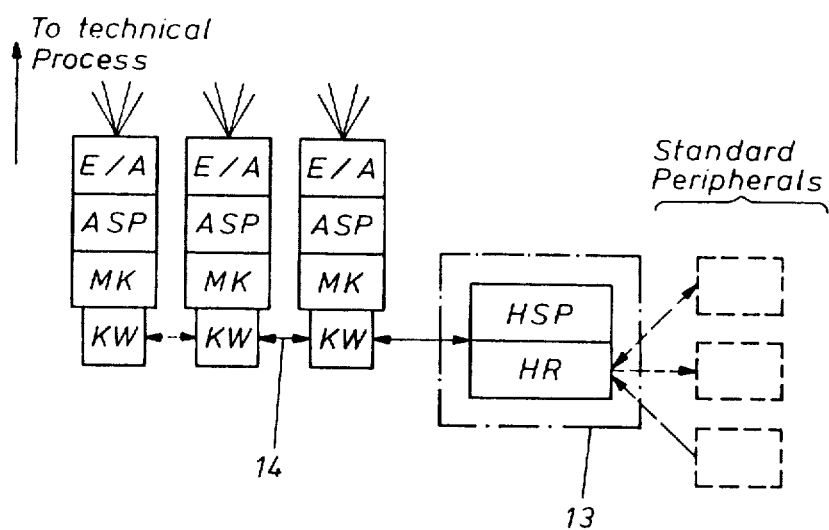
FIG. 5 shows a decentralized structure model with several microcomputers connected to a common branch line.

Furthermore a structure with a common branch line 14 to the main computer (HR) 13 is possible (FIG. 5).

BUS AND DATA COMMUNICATION

Although a reduction in the amount of data is achieved by preliminary processing in the microcomputer stations, a high transfer rate through the bus is to be expected when there is a fault and also when the system is starting up. This maximum flow of information determines the necessary channel capacity. In principle, a decision can be made as to whether a parallel or serial transfer system on the bus is to be used. Combination solutions are also feasible.

A conventional parallel bus is capable of handling a transfer rate of about 1 megabaud over a distance of, for instance, 1 km. Significant increases of this transfer rate (for instance by one order of magnitude) are not to be expected because the different group delay distortions on the parallel lines cannot be controlled without considerable extra expense. The differences in delay times are due to inhomogeneities along the length of the path.

Serial busses working with two wire transmission lines in the form of coaxial cables or with optical fiber cables are at present already capable of achieving bit rates of about 20 megabaud over distances of several hundred meters. Intermediate amplification and slight reduction of throughput enable distances of several kilometers to be successfully bridged. Other increases in transfer speeds, for instance by as much as an order of magnitude, will be possible in the near future if the present rate of component development continues.

Among the several illustrated structures, that shown in FIG. 4 has a particularly low failure probability. If one of the microcomputers (MK) fails, then its tasks should be capable of being performed by another computer. These requirements dictate the structure of the interchange switching system.

Figure 6:
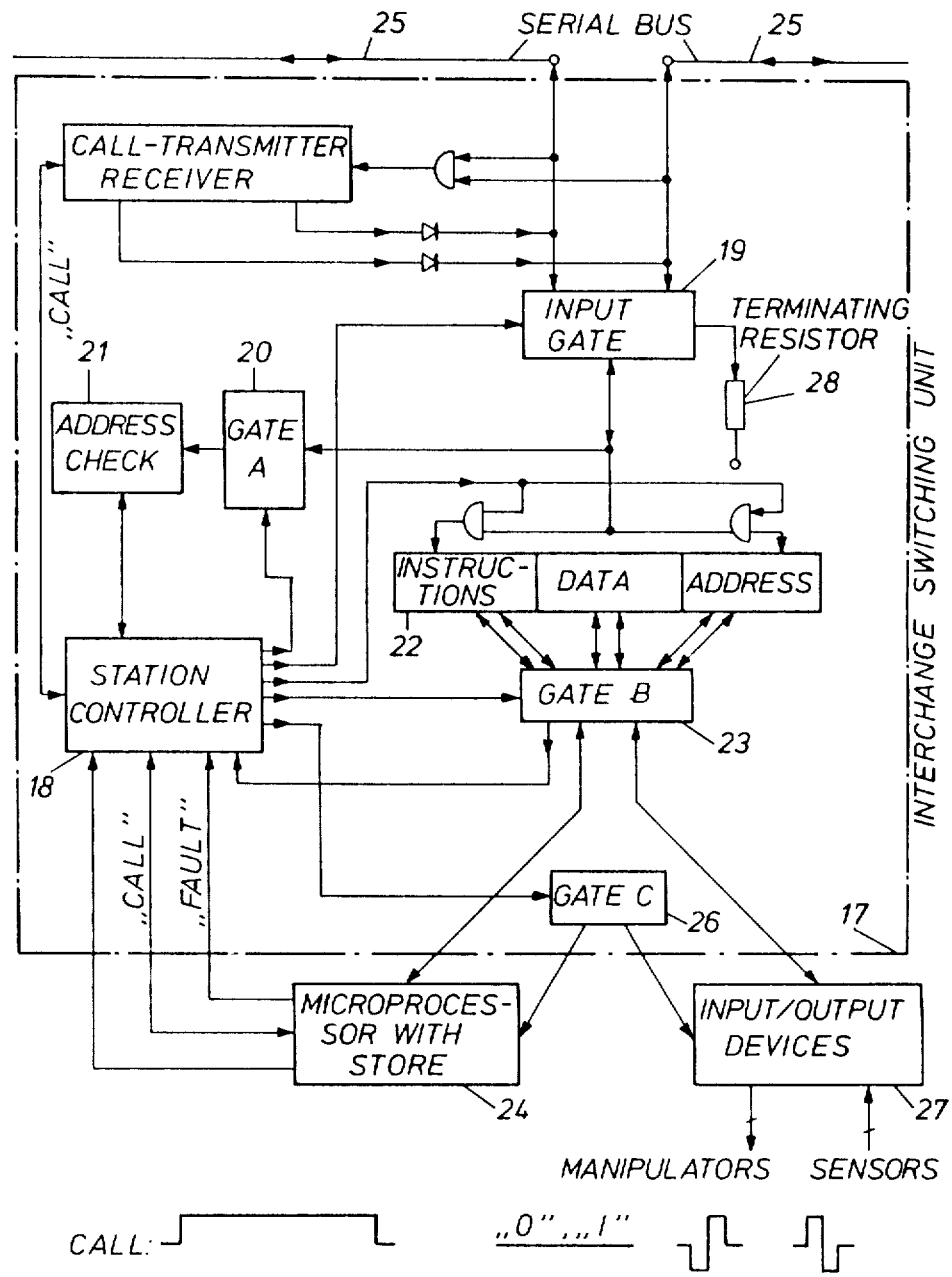
FIG. 6 shows a concept of the microcomputer station with a switching system permitting connection of the microcomputer and/or the input/output devices to a serial bus.

FIG. 6 is one concept of such an interchange switching system 17 which permits connection to be made to a high-speed serial bus.

When, in this concept, an interchange switching system sends a call to the bus all the other interchange switching systems are set to address-receiving state by their station controller 18. In those interchange switching systems which recognize their own station code by the address check unit 21, the receiving state is maintained, the input gate 19 remains open and gate A 20 is closed. The input gates of those interchange switching stations which have not been called reclose. In the following shift register 22, the necessary serial to parallel conversion of the received information takes place. Gate B 23 conveys instructions, data and addresses to the microcomputer 24. Instructions may also be conveyed to the station controller. The microcomputer will then control the input/output operations by gate C 26. However, if the microcomputer has failed, then the information bypasses it by means of gate B and gate C directly to the input/output devices 27. During transmission, the shift register carries out the parallel-to-serial conversion. The input gates which were open during transmission are closed by a code end signal. The ring bus 25 is opened at one point during operation for physical reasons. Depending upon the failure situation, transmission may be in only one direction or in both directions. Faults in the bus must be isolated from the neighboring stations. Faults due to reflexions in the case of electrical transmission lines at the open bus ends can be disregarded for slow transfer rates but for higher transfer rates they must be terminated by the wave resistance 28 of the ring bus. In order to provide the correct states of termination, the system must be continuously informed of the nature of the fault and its location. For this purpose each interchange switching unit sends test messages in the event of a transmission failure detected either by a time-out circuit or by a check word failure. By means of these test messages, the operability of all bus line segments, each of which connects two neighboring stations, is tested; and the bus line status is determined and reported to all stations still connected together.

RELIABILITY AND MAINTAINABILITY

The inherent reliability of a process computer system depends substantially upon the probability of failure of the several components, of data transfer through the channels, the possiblities of limiting errors by the programming system, the erro-freedom of the programs themselves and the reliability of man-machine communication.

It is now proposed to use the independent, though small, computing capacity of the microcomputers to achieve the desired reduction in the effect of faults without the provision of a special back-up system. For this purpose, DDC algorithms are provided in all microcomputers as well as smoothing, plausibility check, redundancy reduction algorithms and emergency programs. Redundancy reduction is performed by a hardware and/or software unit in each station. This unit receives all input signals from the technical subprocess associated with a computer station and recognizes significant changes of at least those process signals which cause data transfers through the bus line system. By virtue of this unit, the data transfer rate through the bus line system is minimized. These program modules are kept available in the main computer, too. Fault reports based on concurrent self-checking processes trigger emergency steps in microcomputer stations or in the main computer if necessary as described in more detail below. Smoothing is the well known method of lowpass filtering (analog or digital) of process signals. Plausibility check performs a check of e.g. the range of values of the measured process signals. Redundancy reduction avoids recording of redundant values of the process signals. Fault reports are generated by the station controllers 18 (FIG. 6) and layed down in status words in each station.

A status word contains bits indicating the activities of the internal information paths of the station—e.g. time-out signal and address or data error the operability of power supply the periodical resetting of a time-out circuit by program the activity on the ring bus derived from a time out signal or from a check word the correct real time control of a test control loop connected to the input-output devices of the station.

A status word like this exists in the station controller which generates status reporting messages to each other station for triggering external control by another computer of the system and which causes an adequate switching state of the gates 19, 20, 23 and 26 contained in the interchange switching unit. The gates are controlled by the station controller in accordance with the transmitting or receiving activity on the ring bus respectively of said status word:

In case of failure of the computer 24, consisting of a processing unit 10 and a working storage 12, the computer 24 is disconnected by means of the gates 23 amd 26, and another computer station of the system being triggered in said manner supplies the input/output devices 11 by means of messages conveyed by the ring bus and the gates 19 and 23.

In case of failure of the interchange unit 8 or the ring bus 9, gate 23 is closed, the exchange of messages with other computer stations is suspended and the computer 24 supplies the input/output devices 11 in an isolated manner.

Figure 7:
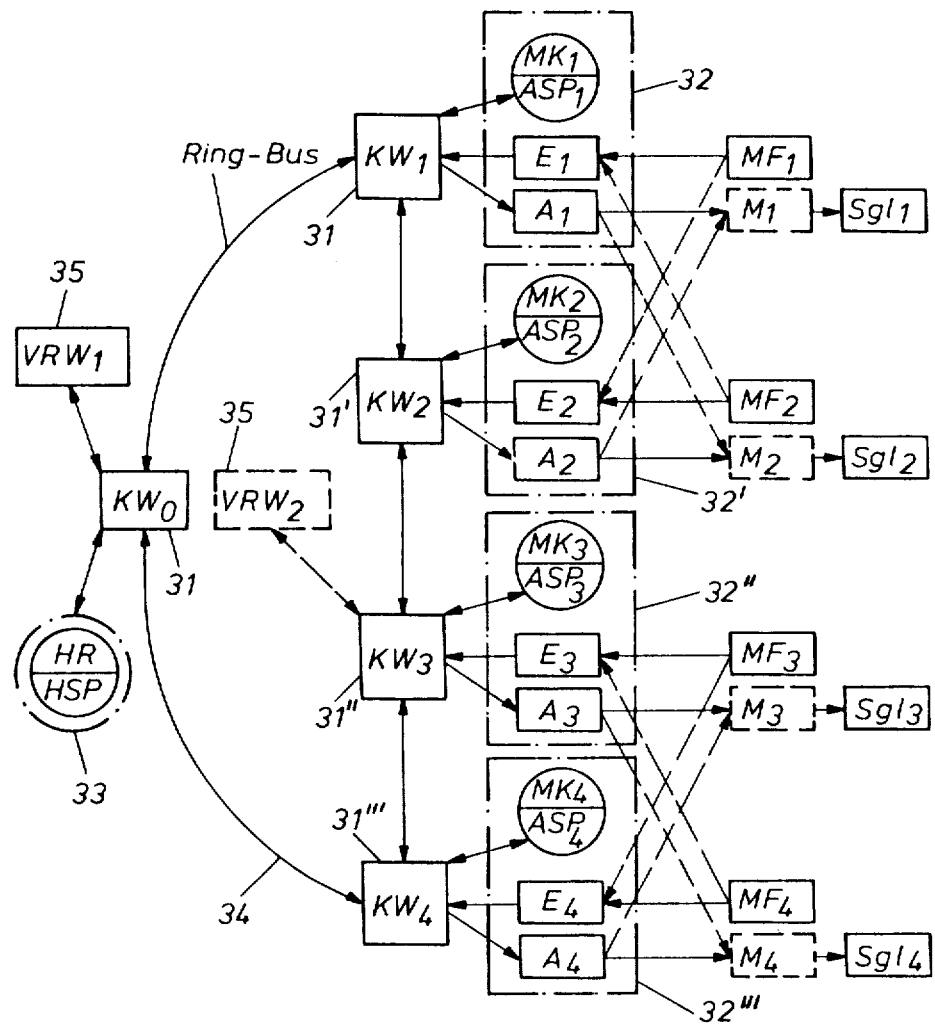
FIG. 7 illustrates the wiring structures of a process computer system comprising several microcomputer stations connected by a ring bus.

FIG. 7 illustrates the wiring structure of a process computer system comprising several microcomputer stations 32 connected by a ring bus 34 to the main computer 33. The entire flow of data in this ring bus in monitored and controlled by a priority unit (VRW) 35. The priority unit (VRW) coordinates the communication between the processor stations which takes place by messages to be sent on the bus line system by the source station and to be taken from the bus line by the destination station. This priority unit may be built up centralized or decentralized by hardward or by programs running in every computer station particularly in their interchange switching system (KW) 31. This ensures that only one computer is on the bus at any one time. Steps which serve for improving reliability are indicated in chain lines.

Figure 8:
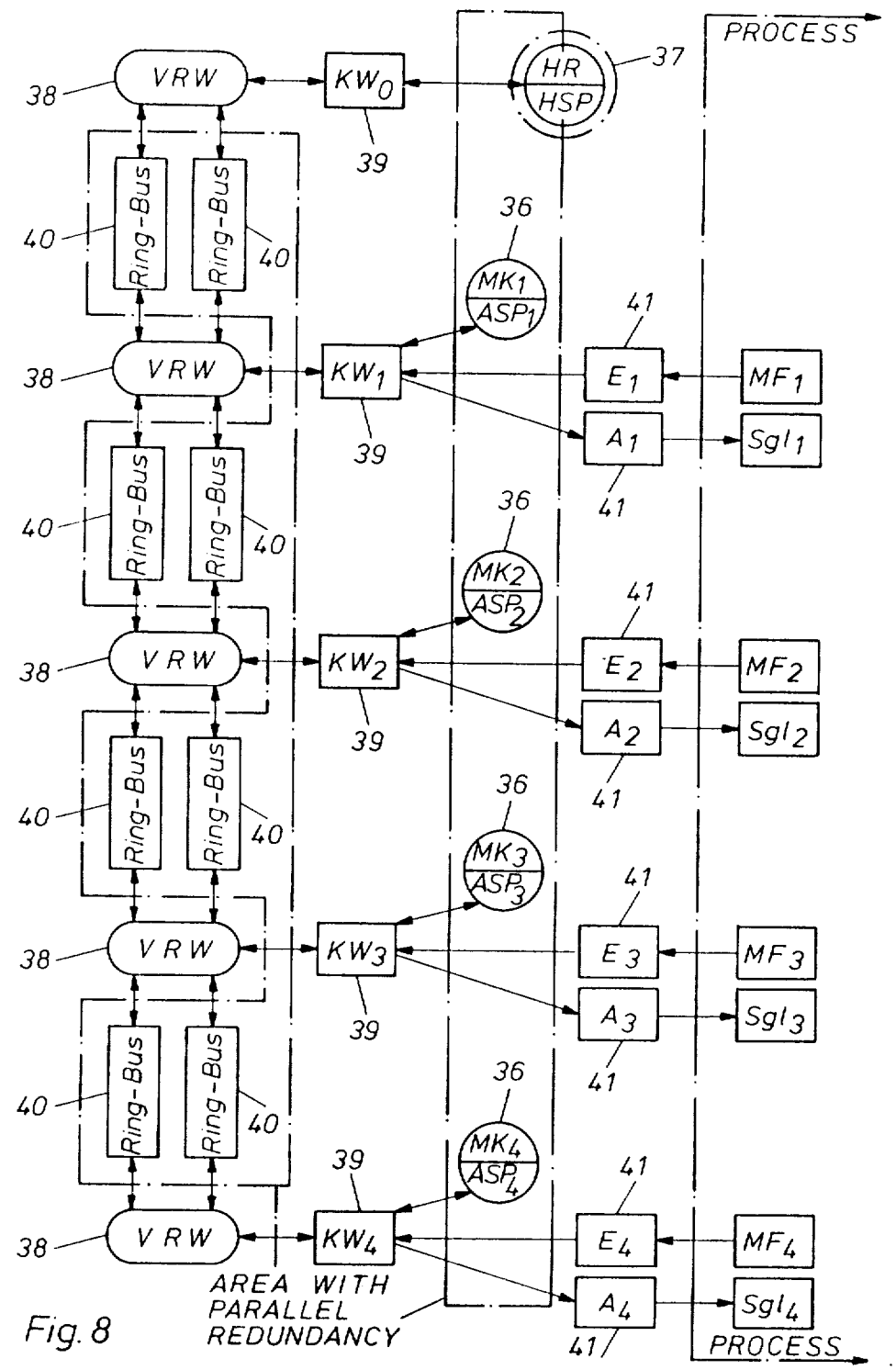
FIGS. 8 and 9 are two possible functional diagrams based on FIG. 7.
Figure 9:
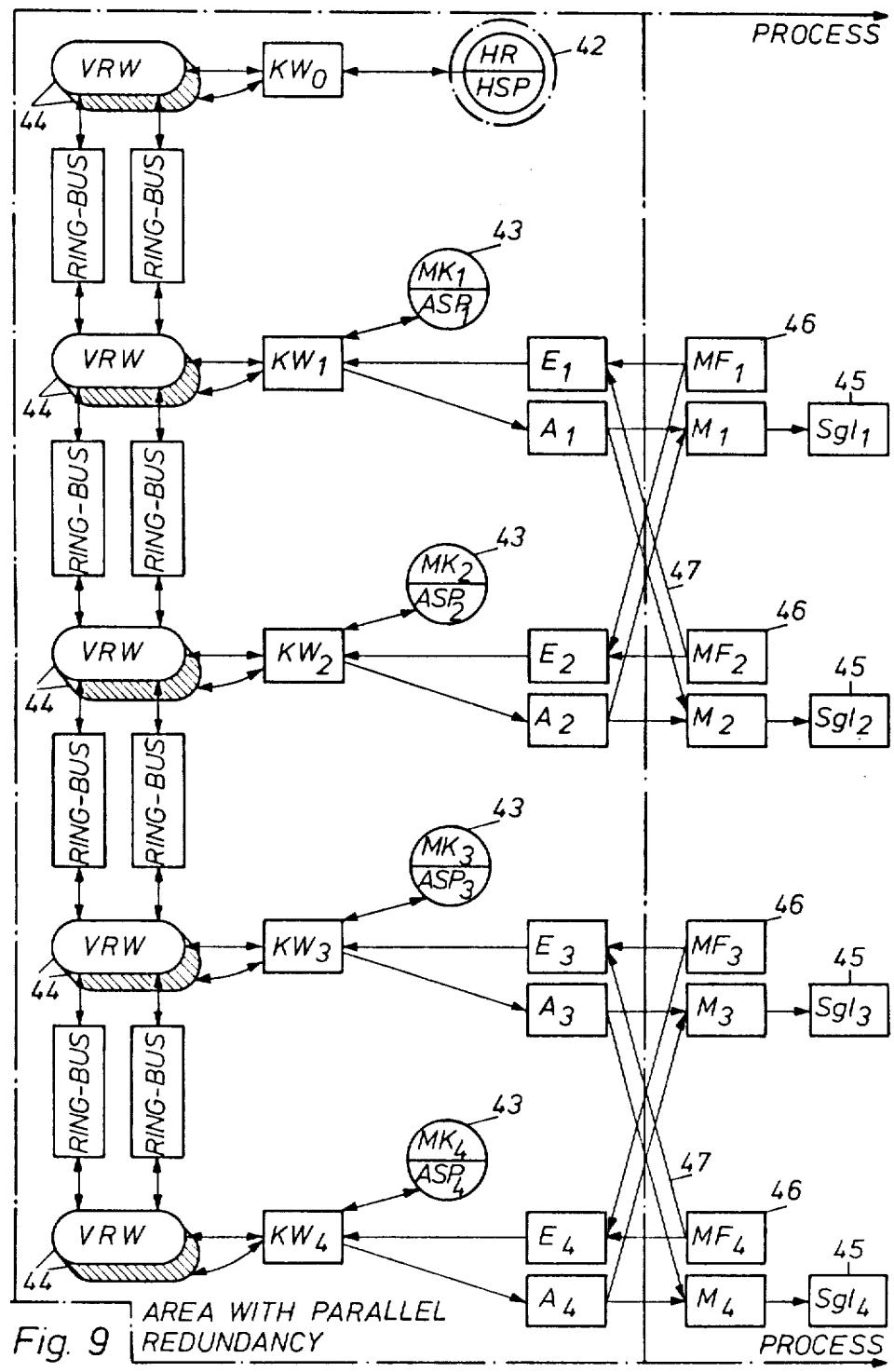

Based on FIG. 7, two possible functional diagrams are illustratively shown in FIGS. 8 and 9.

In FIG. 8, the ring bus structure and the microcomputers provide redundancy areas. If the two possible transfer paths between two computers on a ring line are to provide a quadratic reduction of the failure probability of the line system, then steps must be taken to ensure that the failure probabilities of the two separate paths are completely independent. The two paths leading to a microcomputer must therefore be contained in different cable duct runs. The task distribution has been so chosen that central coordination tasks proceed only in the main computer 37 and in a central priority controller 38. The main computer can undertake the functions of failed microcomputers 36, but the tasks performed by the main computer can be only partly solved by the microcomputers. Since the functions of the priority controller are needed for any data traffic between the computers, the priority controller is shown in this functional block diagram incorporated between the interchange switching unit 39 and the two branches of the ring bus 40. The non-redundant parts, such as the priority controller, interchange switching units and input-/output devices 41 of the stations can be of very reliable design, particularly since the development of computer technology leads to the expectation that in the next few years the mean fault intervals in standardized switching units will lengthen substantially. If, therefore, the requirements which the system reliability is to fulfill are not set too high, the provision of an independent back-up system can be dispensed with.

In FIG. 9 the tasks distributed between the main computer 42 and the microcomputers 43 are evenly weighted. Consequently, functionable computers can undertake the tasks of a faulty computer. The priority controller 44 for the bus is duplicated. Furthermore, connections 47 between neighboring microcomputer stations are provided in such a way that each microcomputer can also operate the sensors 46 and actuators 45 associated with one of its neighbors. The expenditure which is involved in realizing these steps is substantially lower than that involved in the provision of an additional back-up system. Nevertheless, the system efficiency, when there are partial breakdowns, is exceptionally high.

The introduction of parallel redundancy permits system modules to be replaced or maintained while the system remains in operation. Consequently, after repair or replacement of a module the system will completely reincorporate this module in its operations without any further action on the part of the operator being required.

By the employment of highly integrated semiconductor circuitry (LSI), particularly of microcomputers, a structure in self-contained boxes (e.g. casting) is possible. Another simplification arises by a power supply through the bus line. The current needed by the computer stations may be fed in a decentralized manner into a part of the bus line especially constructed as a power supply bus. Each station feeds into this power supply bus and branches that portion needed by the station. Thus, the amount of the current to be fed in at each station can be dimensioned according to the structure of the distribution system of the distributed computer stations.

Particularly rapid bus lines which are free from electromagnetic interference are achieved by using optical fiber cables. The supply of current through such a bus is possible, for instance, by making use of the metal sheath.

A further improvement in reliability is secured by a variable or distributed allocation of bus line control. For instance, the operative station having the lowest code number transmits time slices of predetermined priority which are seized in the order of their code number or position in the ring by the stations which have messages of this priority to transmit. If no time slices arrived within the allocated time the station having the next higher code number automatically takes over this function.

In the following, two possible methods of transmission control are outlined as examples.

The first method is called "serial transmission with central control". It is based on the existence of one single transmission controller at a time by means of a corresponding program module. Each station surveys the intervals between messages, each time counter being proportionally adjusted to the ordinal number of the station concerned. In case the station with the lowest address fails, the succeeding station (next time counter value) activates its program module. In case of line interruption the activation is automatically shifted to the station next to the interruption. At the end of an additional and longer time interval that station initiates a different mode of transmission: "oscillating mode of transmission" (FIG. 10).

The master station transmits dummy messages containing priorities. The first station requesting to transmit replaces the dummy message by full message containing a destination/address. all the stations fowarding a full message can set the semaphores and hereby signal their request of transmission to the master station on the quickest way possible. The latter transmits dummy messages of the requested priority as long as all requests are served.

The reliability and security of the system is basically not affected by the omission of messages of acknowledgement, as described in a different paper.

Figure 11:
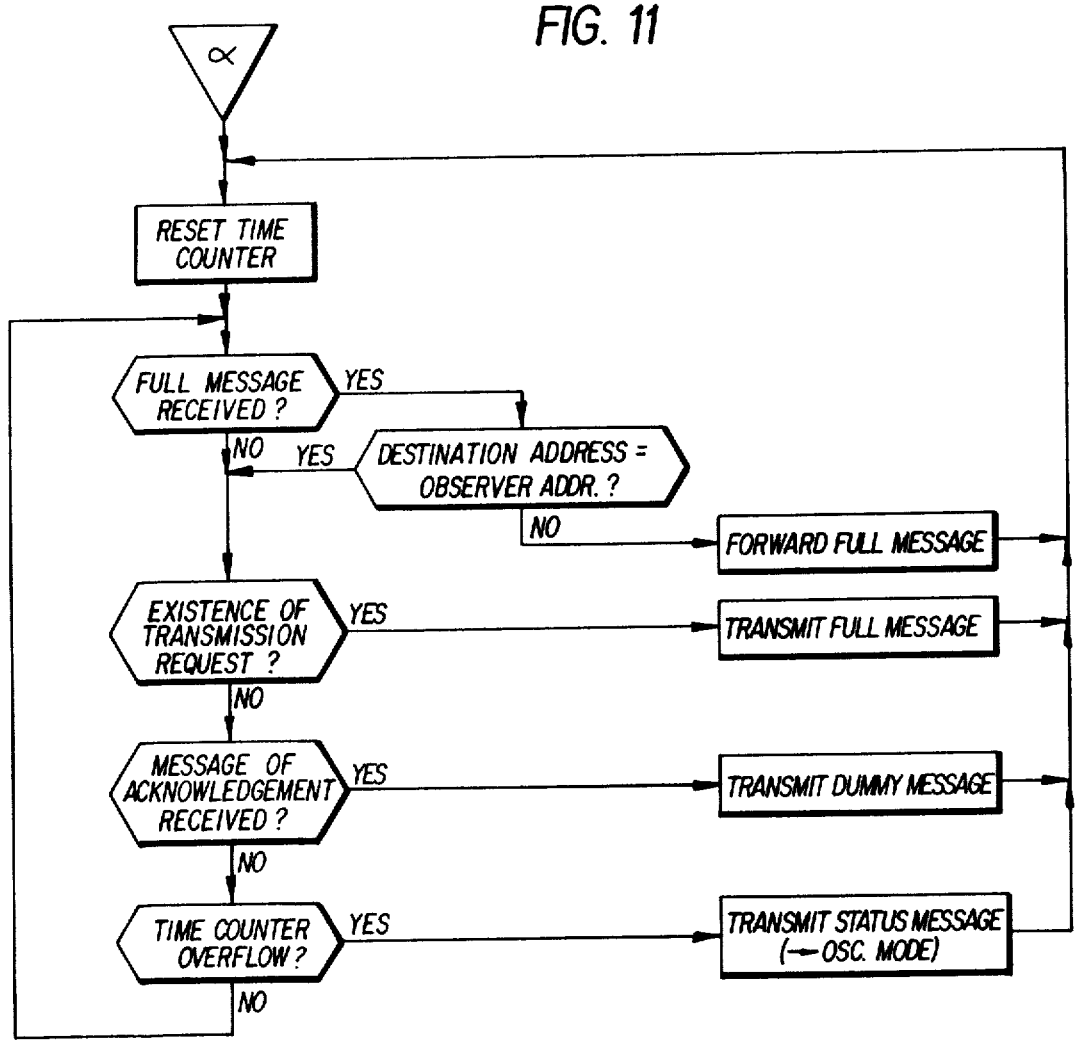
Figure 12:
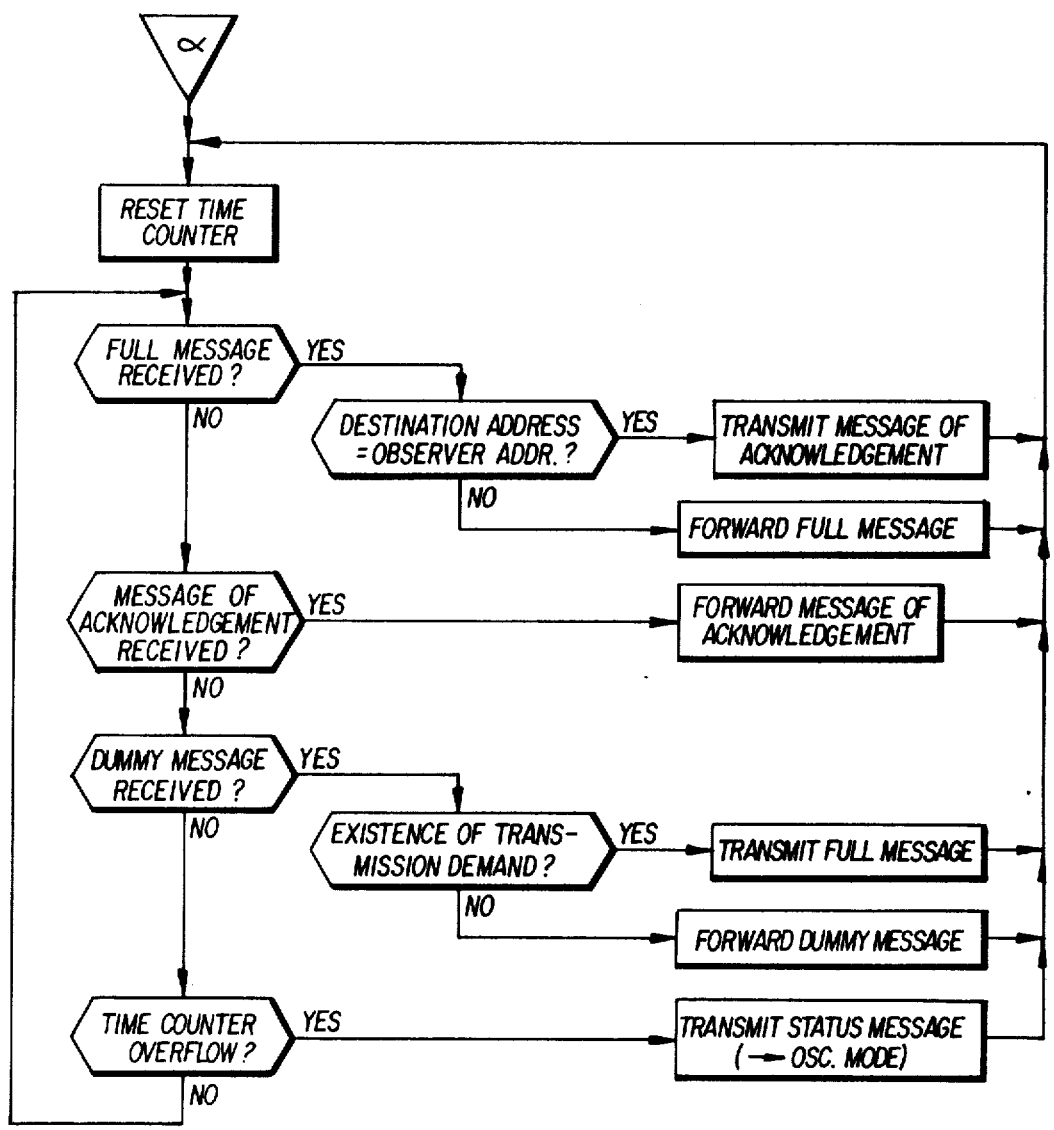

However, the method described above requires a special message of acknowledgement to the master station. It signals the end of each activity of communication (FIGS. 11, 12). Otherwise a buffer storage has to be provided in each station in case of replacing a dummy message by a full message and simultaneously receiving a subsequent full message to be forwarded.

The second method is called "simultaneous transmission with individual control". It is based on the existence of transmission controllers in each station. The observer station, as soon as the signal of the end of a message being forwarded has passed and no signal of the start of a new message has arrived at the receiver, may transmit a message of its own (FIG. 13). Priorities do not exist. The messages are of variable length. The longest message provided comprises a maximum of 1,200 bits including the complete header and the check code, and lasts up to 120 $\mu$s at a transmission rate of 10 Mbit/s.

Figure 14:
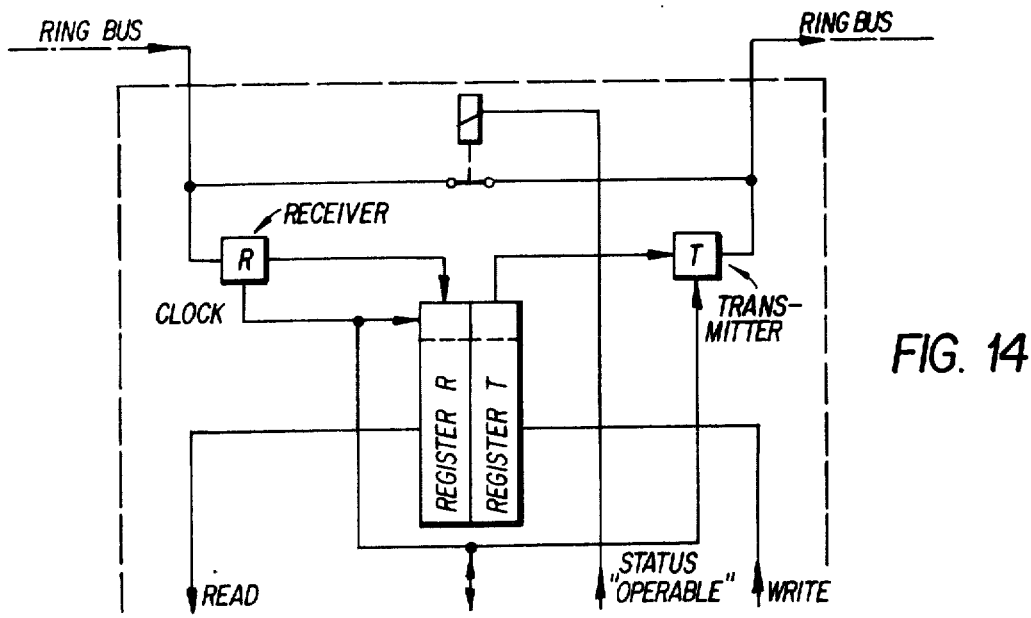
FIG. 14 is a schematic representation of a circuit arrangement for a receiving/transmitting module.

This method allows the transmission of several simultaneous messages, unless busy segments of the ring bus overlap. However, a buffer storage has to be provided in each station in order to avoid the collision of messages in case of overlapping and a transmission of message at the same time (FIG. 14).

A line interruption does not require any particular measure for messages containing destination addresses of stations up to the interruption. As to the remaining destination addresses, the "oscillating mode of transmission" is required. Obviously a time counter of long intervals is necessary in each station which effects the alternate activation of either station next to the interruption.

QUANTIFICATION OF THE "SERIAL TRANSMISSION WITH CENTRAL CONTROL"

The efficiency of this method is determined by the service rate $P_{sj}$. This is based upon the following suppositions:

no varying priorities of messages uniform probability distribution of destination addresses uniform probability distribution of transmission requests.

Definitions:

n . . . total number of stations j . . . ordinal number of station

P . . . probability of transmission request $P_{f1}$ . . . probability of master station 1 transmitting a dummy message $P_{lj}$ . . . probability of station j receiving a dummy message $P_{sj}$ . . . probability of staton j transmitting a full message $P_{u}$ . . . probability of a full message having a destination/address beyond master station 1.

The probability of station j receiving a dummy message decreases with the distance to master station 1:

station 2: $P_{12} = P_{f1}$ station 3: $P_{13} = P_{f1} \cdot (1-p)$ station 4: $P_{14} = P_{f1} \cdot (1-p)^2$ station j: $P_{lj} = P_{f1} \cdot (1-p)^{j-2}$ (9)

The transmission probability results from the compound probability that a transmission request exists and a dummy message arrives. Using Eq. (9) we obtain:

$$P_{sj} = p \cdot P_{f1} \cdot (1-p)^{j-2} \qquad (10)$$

The master station 1 transmits dummy messages as long as it does not transmit a full message of its own or has to forward a full message from another station:

$$P_{f1} = 1 - p_{s1} - P_u \qquad (11)$$

where we write because of the uniform distribution of destination addresses:

$$P_u = \sum_{j=2}^{n} P_{sj} \cdot \frac{j-2}{n-1} = \frac{P \cdot P_{l1}}{(n-1)} \cdot \sum_{j=2}^{n} (1-p)^{j-2}(j-2) \quad (12)$$

$$= P_{l1} \frac{(1-p)}{(n-1)p} [1 - (n-1)(1-p)^{n-2} + (n-2)(1-p)^{n-1}].$$

The master station 1 itself transmits a full message with the probability $P_{s1}$ on request of a transmission (p) and if the bus is not busy with a full message being forwarded $(1 - p_{\ddot{u}})$:

$$P_{s1} = P \cdot (1 - p_u). \quad (13)$$

From this we may calculate the transmission probability $P_{ll}$ using the Eq. (11) to (13).

$$P_{l1} = 1 - p \cdot (1 - p_{l1} \cdot A) - P_{l1} \cdot A \quad (14)$$
$$= (1 - p) - P_{l1} \cdot A \cdot (1 - p)$$
$$= \frac{(1-p)}{1 + (1-p) \cdot A}.$$

With the help of Eq. (10) we get the transmission probability $P_{sj}$ of a station j:

$$P_{sj} = p \cdot \frac{(1-p)}{1 + (1-P) \cdot A} \cdot (1-p)^{j-2}$$
$$= \frac{(n-1) \cdot p^2 \cdot (1-p)^{j-1}}{(n-1)p + (1-p)^2[1 - (n-1)(1-p)^{n-2} + (n-2)(1-p)^{n-1}]}.$$

The result is particularly dependent on the position of the station j relative to the master station 1. For very small p only, it approximately equals the transmission request probability.

$$\lim_{p \to O} P_{sj} = p \quad (16)$$

Figure 15:
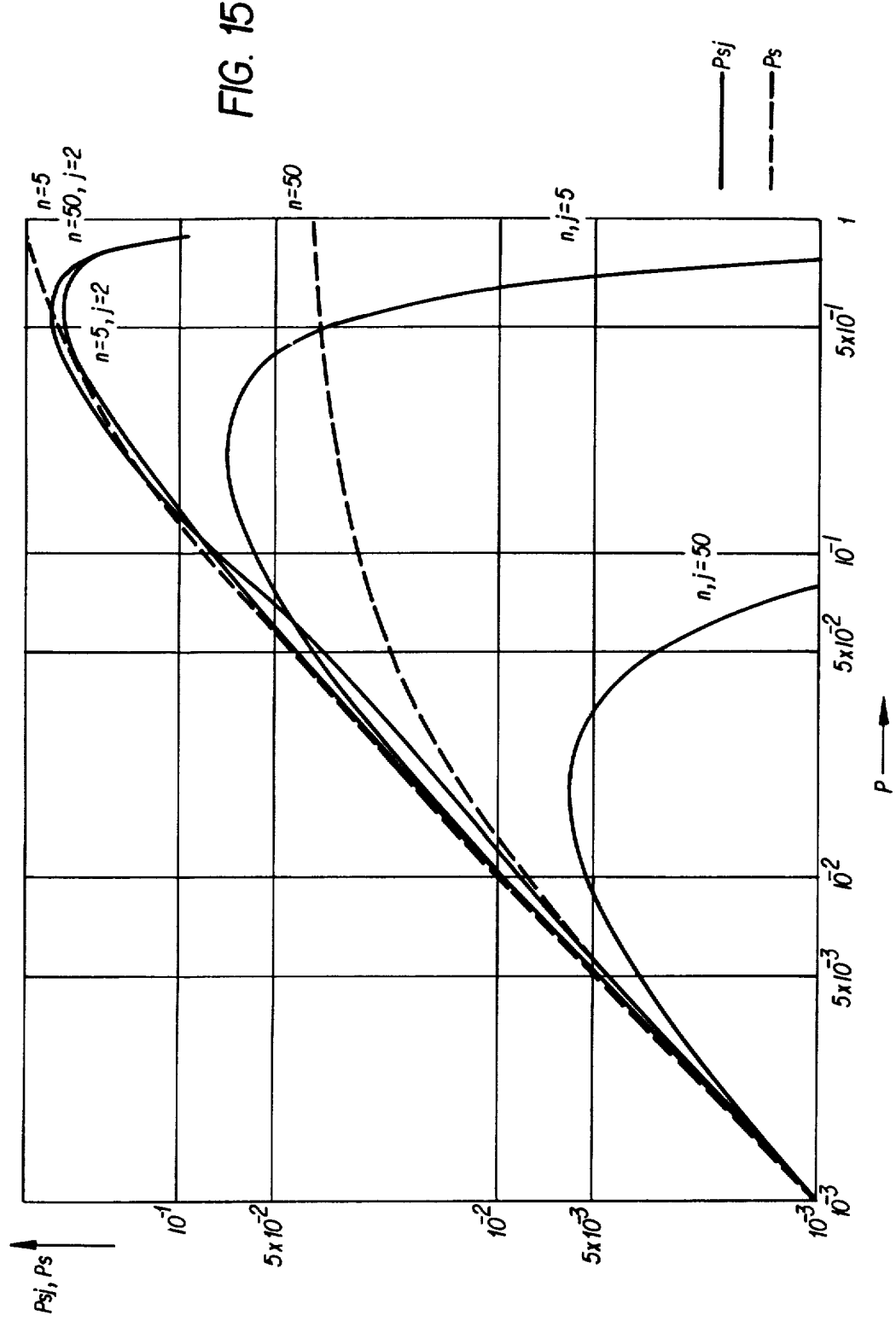
FIG. 15 is a graphical representation of transmission probabilities.

Details are shown in FIG. 15.

QUANTIFICATION OF "SIMULTANEOUS TRANSMISSION WITH INDIVIDUAL CONTROL"

In addition to the same assumptions as in the preceding paragraph, it is also assumed:

$P_s$ . . . probability of a random station transmitting a full message $P_{\ddot{u}}$ . . . probability of this station receiving a full message that contains a destination/address beyond it and that has to be forwarded.

$P_v$ . . . as before, but buffered temporarily and to be forwarded later.

The probability that a random station transmits is calculated from the compound probability that a transmission request of its own exists and that no other message has to be fowarded:

$$P_s = P(1 - P_u - P_v). \quad (17)$$

In accordance with Eq. (12) it is found:

$$P_u = \sum_{j=2}^{n} P_s \frac{j-2}{n-1} = P_s \cdot \frac{n-2}{2}. \quad (18)$$

The probability of being forced to buffer temporarily sults from the compound probability which arises from the coincidence of message forwarding with either message transmission or forwarding the buffer contents:

$$P_v = P_u \cdot (P_s + P_v). \quad (19)$$

From this the following is obtained:

$$p_s = p \left( 1 - p_s \cdot \frac{n-2}{2} - \frac{p_s^2 \cdot \frac{n-2}{2}}{1 - p_s \cdot \frac{n-2}{2}} \right) \quad (20)$$

wherefrom:

$$p_s = \frac{1 + (n-2)p - \sqrt{1 + 2(n-2)p^2}}{(n-2)(1 + \frac{n-2}{2}p - p)} \quad (21)$$

Here the transmission probability is independent of the position of the station on the ring bus.

Again, for very small p it approximately equals the transmission request probability:

$$\lim_{p \to O} p_s = p \quad (22)$$

(15)

Details for 5, and 50 stations are shown in FIG. 15.

COMPARISON AND SELECTION OF A METHOD

The characteristics of the two methods with regard to the transmission requests of the stations can be pointed out by the following apparent qualifications:

"serial transmission with central control" shows a relative maximum of transmission probability at each station depending on average transmission request probability, number of stations, and position of observer station. The transmission probability decreases very fast beyond this maximum;

"simultaneous transmission with individual control" shows a monotone increase transmission probability depending on average transmission request probability and number of stations, but, it is independent of the position of the stations.

Hereby, the planning to apply the first method will be particularly difficult as exceeding the maximum of the transmission probability has to be avoided and stations with a particularly high transmission request probability have to be arranged as near to the master station 1 as possible.

The reliability and performance of the computer system is further increased by dynamic allocation of the several data processing programs to the microcomputers, according to their operability, ascertained by the above described fault detector circuits and programs. The operability of each individual station is regularly checked as described above. These status information are transmitted to the main computer and possibly to all the other stations as well. In dependence thereon, the allocation of tasks, i.e. the allocation of partial programs (activation or loading), can be effected according to the state of the system. This is facilitated by a coordinated addressing control of the entire storage space available in the system. This enables any computer station, simply by means of the message address, to gain direct access to storage facilities which are physically associated with another processor station.

The facilities outlined in the preceding paragraph also provide fundamental means for making programming easier and facilitating communication between man and computer system. By extending higher programming languages as well as operational and system components by a station and loading division for describing the station properties and for determination of the reactions desired in case of breakdowns, it is possible to reload the microcomputer stations from a main computer, equipped with standard periphery and possibly lacking a process periphery, to provide programming assistance for the entire system by compiler, linkage editor and loader. Any suitable program can be loaded through the bus into the corresponding computer station dependent on the functional state of the entire system, although the programmer will be formulating the programs in one higher language.

The invention may be embodied in other specific forms without departure from the spirit or essential characteristics thereof. The embodiments are therefore to be considered in all respects as illustrative and not restrictive.

We claim:

1. An electronic data processing system for real time data processing comprising
   (a) a main computer station for supporting man-machine communication and application program development and system maintenance;
   (b) a plurality of microcomputer stations at spaced locations and coupled to said main computer station, each of said microcomputer stations comprising
      (1) an input power supply;
      (2) a resettable time-out circuit coupled to said power supply;
      (3) an internal working storage coupled to said power supply;
      (4) a microprocessor coupled to said internal working storage;
      (5) input/output devices coupled to said working storage;
      (6) a test control loop coupled to said input/output devices;
      (7) an interchange switch means including switching gates; and
      (8) a station controller for controlling the switching state of said switching gates;
   (c) a ring bus system for interconnecting said plurality of microcomputer stations through said interchange switch means for conveying messages between said computer stations in a bitserial mode, said ring bus system providing two independent paths;
   (d) fault detecting means in each of said microcomputer stations, said fault detecting means comprising a station controller for monitoring activities on internal paths including activities of said power supply, said working storage, and said resettable time-out circuit, and for monitoring outside activities including activities of said ring bus and outputs of programs stored in said working storage for producing defined signals in real time for controlling said test loop;
   said fault detection means including means for generating fault reports, including a status word stored in the station controller, and including means for transmitting status reporting messages to each other microcomputer station for triggering external control by another computer of said system through control of the switching state of said switching gates in said interchange switching unit, said station controller receiving said status reporting messages in accordance with the transmitting or receiving activity on the ring bus;
   whereby, failure of one of said microcomputers consisting of said microprocessor and said working storage causes said microcomputer to be disconnected by means of said gates and another microcomputer station of the system triggered in said manner supplies said input/output devices by means of messages conveyed by said ring bus and said gates; and
   whereby failure of one of said interchange units or said ring bus closes one of said gates and the exchange of messages with other computer stations is suspended and the associated microcomputer supplies the input/output devices in an isolated manner.

2. An electronic data processing system as defined in claim 1 wherein each of said interchange switching units is adapted to select the fault-free transmission path in the event of one fault in said ring bus system by means of messages which test the operability of all ring bus segments each of which connects two neighboring stations and report the ring bus status to all stations still connected together.

3. An electronic data processing system as defined in claim 1 wherein said bus line system is adapted to supply current to said computer stations by means of decentralized feeding of current at each computer station into the ring bus cable and branching the accumulated current at each station for station supply.

4. An electronic data processing system as defined in claim 1 wherein said bus line system comprises optical light conducting fiber cables.

5. An electronic data processing system as defined in claim 1 wherein each input and output device is connected to at least two computer stations.

6. An electronic data processing system as defined in claim 1 further comprising a redundancy reducing unit for receiving all input signals from said microprocessor stations, said redundancy reducing unit recognizing significant changes of at least those process signals which cause data transfers through the bus line system and hence being adapted to minimizes the data transfer rate through said bus line system.

7. An electronic data processing system as defined in claim 1 further comprising means for decentralizing control of the traffic between said computers to improve reliability.

8. An electronic data processing system according to claim 1 wherein said decentralized control means is adapted to transfer time slices identified with priorities.

9. An electronic data processing system as defined in claim 1 further comprising common control means for the entire storage space of said system and wherein said bus line system provides each computer station with direct access to the store of other computer stations.

* * * * *